US00RE33945E

United States Patent [19]

Beaty

[11] E Patent Number: Re. 33,945

[45] Reissued Date of Patent: Jun. 2, 1992

[54] EXTENDIBLE HOSE ASSEMBLY FOR SERVICE TRUCK

[76] Inventor: William G. Beaty, 23903 Strange Creek Dr., Diamond Bar, Calif. 91765

[21] Appl. No.: 679,168

[22] Filed: Mar. 26, 1991

Related U.S. Patent Documents

Reissue of:

[64] Patent No.: 4,708,179
Issued: Nov. 24, 1987
Appl. No.: 41,118
Filed: Apr. 22, 1987

U.S. Applications:

[63] Continuation of Ser. No. 434,888, Nov. 13, 1989, abandoned, which is a continuation-in-part of Ser. No. 818,874, Jan. 14, 1986.

[51] Int. Cl.[5] ..... B67D 5/36

[52] U.S. Cl. ..... 141/388; 141/231; 16/386; 137/615; 137/899; 137/355.12; 137/355.24

[58] Field of Search ..... 16/386; 141/231, 279, 141/382, 387, 388, 389; 137/899, 615, 351, 355.12, 355.16, 355.2, 355.17, 355.23, 355.24; 285/62, 162, 189

[56] References Cited

U.S. PATENT DOCUMENTS

| | | | |
|---|---|---|---|
| 2,717,136 | 6/1955 | Greeson | 137/355.16 |
| 2,727,534 | 12/1955 | Briede | 137/615 |
| 3,068,508 | 12/1962 | Heyer | 16/386 |
| 3,085,593 | 4/1963 | Sorenson | 137/615 |
| 3,165,109 | 1/1965 | Hammelmann | 137/355.16 X |
| 3,256,277 | 2/1966 | Hirashiki | 16/386 |
| 3,356,102 | 12/1967 | Johnson | 137/357 |
| 3,451,628 | 6/1969 | Kelley | 137/615 |
| 3,467,301 | 9/1969 | Doyle et al. | 137/355.16 |
| 3,469,601 | 9/1969 | Harper | 137/615 |
| 3,707,990 | 1/1973 | Schaible et al. | 137/615 |
| 3,712,331 | 1/1973 | Otto | 137/355.16 |
| 3,825,045 | 7/1974 | Bloomquist | 141/198 |
| 3,891,004 | 6/1975 | Knight | 137/615 |
| 3,911,954 | 10/1975 | Johnson | 137/615 |
| 3,964,512 | 6/1976 | Domas | 137/615 |
| 4,130,134 | 12/1978 | Castle | 137/615 |
| 4,220,177 | 9/1980 | Gill | 137/615 |
| 4,262,696 | 4/1981 | Oury | 137/615 |
| 4,299,262 | 11/1981 | Andrepont | 141/387 |
| 4,318,423 | 3/1982 | DeGraf | 137/615 |
| 4,411,290 | 10/1983 | Heath | 137/615 |
| 4,774,979 | 10/1988 | McKeon et al. | 141/388 X |
| 4,828,033 | 5/1989 | Frison | 137/165 X |

FOREIGN PATENT DOCUMENTS

| | | | |
|---|---|---|---|
| 1058387 | 5/1959 | Fed. Rep. of Germany | 141/388 |
| 2255857 | 7/1973 | Fed. Rep. of Germany | 141/388 |
| 1460292 | 11/1966 | France | 141/388 |
| 2597703 | 10/1987 | France | 141/388 |

*Primary Examiner*—Ernest G. Cusick
*Attorney, Agent, or Firm*—Phillips & Beumer

[57] ABSTRACT

An extendible hose assembly for extending from a *holding tank of a* portable toilet service truck or similar service vehicle to a portable toilet or similar tank to be serviced. The assembly has two rotational hinges for horizontal movement of hoses and at least one hinge allowing vertical movement of hoses. The combination of hinges allows the hoses to be extended for use in any direction from the *tank carried by the* service vehicle *and to be compactly folded in substantially "side-by-side" relation longitudinally along the length of the holding tank.*

7 Claims, 1 Drawing Sheet

EXTENDIBLE HOSE ASSEMBLY FOR SERVICE TRUCK

Matter enclosed in heavy brackets [ ] appears in the original patent but forms no part of this reissue specification; matter printed in italics indicates the additions made by reissue.

*Cross Reference of Related Application*

*This is a continuation of reissue patent application Ser. No. 07/434,888, filed Nov. 13, 1989, now abandoned which is a reissue application for U.S. Pat. No. 4,708,179, issued Nov. 24, 1987 which was filed as Ser. No. 041,418, filed on Apr. 22, 1987. Furthermore, this,* [This] application *Ser. No. 041,115* is a continuation-in-part of application Ser. No. 818,874 filed Jan. 14, 1986, now abandoned.

BACKGROUND OF THE INVENTION

This invention relates to an extendible hose assembly for positioning on a vehicle for servicing portable toilets and the like.

Heretofore it has been customary to wrap a flexible portable hose used in servicing portable toilets around front and rear or like posts, poles or similar mounting arms on the tank of a service vehicle. This has caused numerous problems when attempting to service portable toilets from a service truck. For example, it is time consuming to unwrap and extend the hoses from the truck or like vehicle to the portable toilet, as a long hose has to be wrapped around the mounting arms so that it will reach the toilet when the service vehicle cannot be parked reasonably close thereto. The unwrapping results in the hose falling from the truck and dragging on the ground or through the mud in bad weather in attempting to extend it.

SUMMARY OF THE INVENTION

The present invention is directed to an extendible hose assembly which solves all of the above problems by using at least two hinges to mechanically support the hose assembly and to allow the same to swing in a horizontal plane. A third hinge located at the lower end of the second hinge permits a portion of the assembly to rotate in a vertical plane.

The extendible hose assembly comprises a first elongated, rigid pipe or hose mechanically connected to and extending horizontally from the first hinge to the second hinge and one end of a U-shaped flexible hose; the other end of the flexible hose is connected to one end of a second elongated rigid pipe or hose. The second rigid pipe, in turn, is connected to another flexible section. Hence, all of the hose and pipe portions are serially connected together and in fluid communication with each other.

The first hinge allows the entire hose assembly to swing horizontally, while the second hinge allows the second rigid pipe section to swing horizontally. The third hinge pivotally connects the second rigid pipe portion to the second hinge in a manner that allows the second rigid hose to pivot about the hinge vertically.

The first hinge is shown mounted on the task of a service vehicle, for example, such that a workman can conveniently swing the entire hose combination horizontally away from the tank. This allows the remote end of the last flexible hose of the assembly to be conveniently [manuverable] *maneuverable* and can be easily inserted into the tank of a portable toilet, for example, to pump the contents thereof into the tank of the vehicle.

*Additionally, the hinged arrangement of the present invention allows the extendible hose assembly to be folded in substantially "side-by-side" relation longitudinally along the length of the tank to permit transportation of the tank from one site to another.*

BRIEF DESCRIPTION OF THE [DRAWING] *DRAWINGS*

For a better understanding of my invention reference will now be made to the [drawing]*drawings* which [forms]*form* a part hereof and [represents ] *represent*a preferred embodiment of the invention.

In the [drawing,] *drawings,*

DETAILED DESCRIPTION OF THE INVENTION

Figures 1, 2, 3, 4, 5, 6:
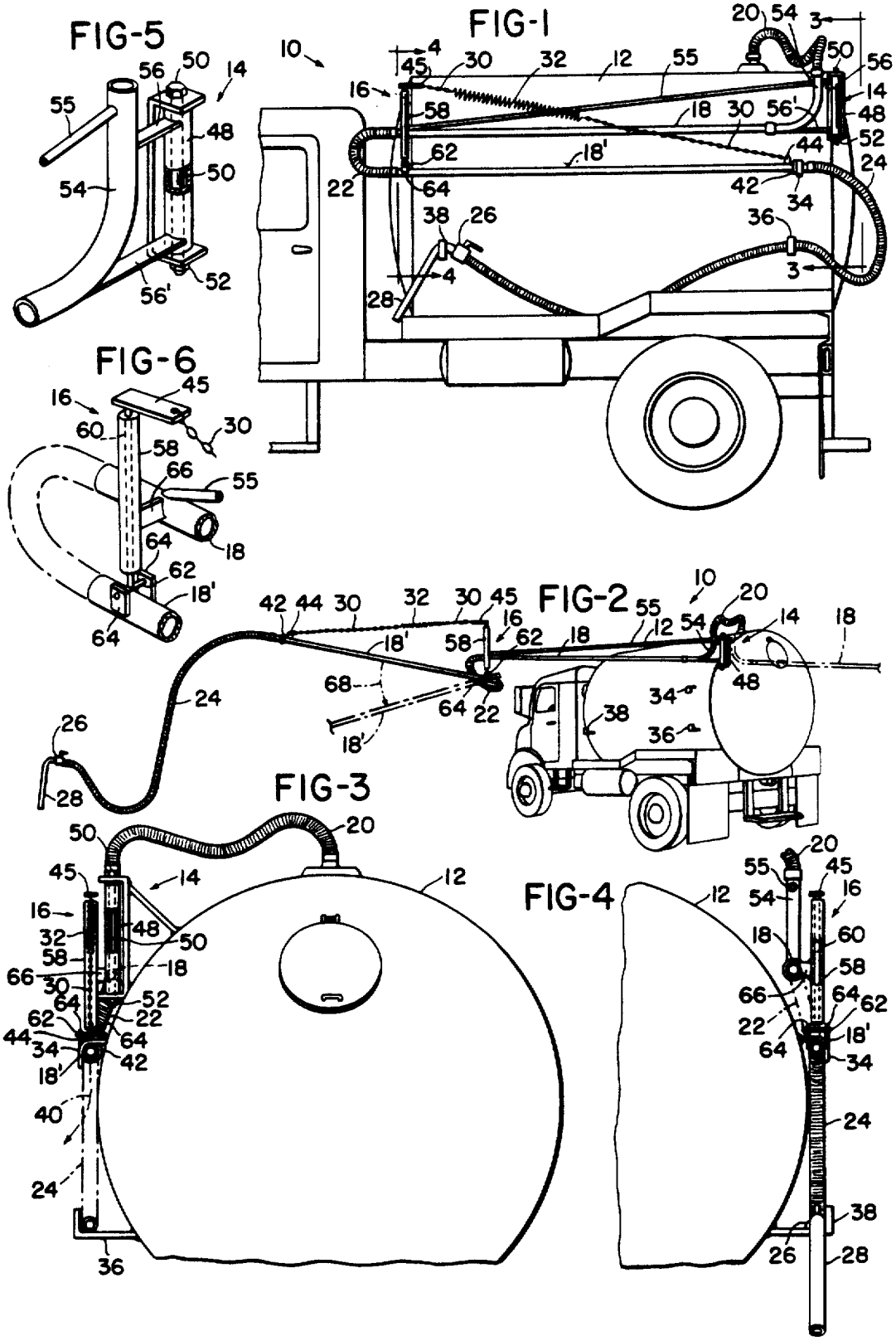
FIG. 1 is a side elevation of a service vehicle with the extendible hose of the invention in storage or mounted position *in vertical "side-by-side" folded relation longitudinally along the tank of the service vehicle.*
FIG. 2 is a perspective view of the service vehicle with the extendible hose in an operative position.
FIG. 3 is an end elevation taken on line 3–3 of FIG. 1.
FIG. 4 is an end elevation taken on line 4–4 of FIG. 1.
FIG. 5 is a perspective view showing a representative rear hinge or pivot construction.
FIG. 6 is a perspective view showing a representative front hinge or pivot construction.

Referring now *to* the [drawing] *drawings,* FIG. 1 thereof shows in side elevation a tank 12 of a service truck 10, and the extendible hose assembly of the invention, the assembly having six serially connected portions bearing numerals 18, 18', 20, 22, 24, and 54 respectively.

Still referring to FIG. 1, hose 20 is a flexible portion of the hose combination, and extends from an upper portion of tank 12 to a curved, rigid hose or pipe portion 54. Pipe portion 54 is attached to a vertically disposed hinge 14. Hinge 14 is shown mounted on an upper, rear portion of the tank. This is best seen in FIG. 3 of the drawings where hinge 14 is shown as being welded to the tank.

The perspective view of FIG. 5 best shows the attachment of hose portion 54 to hinge 14, and a suitable construction for the hinge. More particularly, the hinge is shown as being comprised of a straight tube or hollow cylindrical member 48 located between the legs of a U-shaped bracket, the legs supporting the ends of the cylinder. The cylinder (48) is [rotably] *rotatably* secured in place between the legs of a bolt 50, extending through the legs and cylinder and a nut 52 threaded on the lower threaded end of the bolt. (Tube 48 and a similar structure 58 are discussed in greater detail below.)

Rigid pipe 54 is shown attached to cylinder 48 of hinge 14 by bars 56 and 56' (FIG. 5) of flat bar stock such that 54 is swingable about the vertical axes of 48 and 50.

Pipe portion 54 curves downward to a lower end of hinge 14 and is shown serially connected to one end of an elongated, rigid, horizontally disposed (FIGS. 1 and 2) pipe or hose 18. Hoses 18 and 54 can be a single piece pipe member, i.e., 18 can be provided with a curved portion (54), as opposed to [be] being two pieces. A single pipe member is preferred, as it eliminates connecting the two members together and, of course, the physical connection itself.

The other end of pipe 18 is serially connected to one end of U-shaped flexible hose 22, and attached to a second, vertically disposed hinge 16, as best seen in FIG. 6. Again, hinge 16 is comprised of a straight tube or hollow cylindrical structure 58, through which extends a pin 60 in a manner that allows the pin to rotate in the cylinder. A lug 45 is attached to the upper end of the pin. A second pin 62 is suitably attached to the lower end of the pin 60 crosswise and perpendicular thereto. In addition, the end of rigid pipe 18 adjacent cylinder 58 is attached thereto by a relatively short piece of flat stock 66.

The other end of U-shaped flexible hose 22 is serially connected to a second elongated rigid hose or pipe 18'. Adjacent the location of the connection are two supporting lugs 64 [suitable] *suitably*attached to rigid pipe 18', as best seen in FIG. 6, and rotatably supported on pin 62, i.e., pin 62 extends into and between the lugs and in a manner that allows lugs 64 to rotate relative to pins 60 and 62. This provides a third hinge at the lower end of the second hinge.

The other end of rigid pipe 18' is serially connected to one end of an elongated flexible hose 24. The other end of flexible hose 24 has connected thereto a suitable valve 26 and nozzle 28.

*To support rigid pipe 18' in its extended position (FIG. 2), a resilient support member comprised of end portions 30 and an intermediate joining spring-like portion 32 is provided. One end portion 30 is secured to lug 45 (as can best be seen in FIG. 6), and the second end portion 30 is secured to the end of rigid pipe 18' which is connected to one end of flexible hose 24.*

Tubes or cylinders 48 and 58 are preferably made from long portions of commercially available, mild steel tube stock. The stock is cut to lengths that will fit into the space between the legs of the U-shaped brackets of hinges 14 and 16. Such tube stock is rigid and can also be used for horizontal pipes 18 and 18'. Further, such stock can be bent to far curved portion 54 at the right hand end (in FIGS. 1 and 2) of pipe 18. In addition, the internal diameters of such tube stock are of a size that can receive commercially available bearing assemblies (bearings and bearing races), which are force fitted into the ends of 48 and 58. This provides hinge assemblies that are easily swingable about their axes.

For storing the combination of hoses, as thus far described, one side of tank 12 is shown provided with brackets 34, 36 and 38. As seen in FIG. 1, nozzle 28 seats in bracket 38, while an intermediate portion of flexible hose 24 rests in bracket 36. Bracket 34 receives the end of rigid pipe 18 that is connected to flexible hose 24.

*As can be readily seen in FIGS. 1, 3, and 4 of the drawings, rigid hose sections 18 and 18' are stored the vertical "stacked" side-by-side relation. This "stacked" arrangement is accomplished since the sections 18 and 18' are mounted for horizontal movement in different, respective, horizontal planes as seen in FIG. 2.*

*Thus, it can be seen that the rigid pipes and flexible hoses are foldable longitudinally along and snugly against the tank 12. Such folded relation permits the vehicle to be maneuvered through busy streets and other congested areas as it transports the service tank to areas where it may be needed. Such areas may be hard to reach, somewhat inaccessible, wooded areas, as areas under construction.*

What is claimed is:

1. A portable extendible hose and support assembly mountable on and connectable to a tank located on a service vehicle, comprising in combination:

a [relative] *relatively* short rigid hose, a first hinge comprising a generally U-shaped bracket defined by legs attached to the tank, and a first tubular member having a first axial center supported between the legs of the U-shaped bracket, with a bolt extending vertically through said legs and the axial center of the tubular member, and having a vertical axis, means attaching the tubular member to the short rigid hose, a second hinge comprising a vertically disposed second pin and a second tubular member, with the pin extending through the second axial center of the second tubular member, said second pin having upper and lower ends and a vertical axis, a third hinge comprising a horizontally disposed pin having ends and attached to the lower end of the second pin, with two rotatable legs rotatably attached to the ends of said horizontal pin, said horizontal pin defining a horizontal axis, a combination of serially connected hoses defining hose portions, said first hinge supporting said combination on the tank of the vehicle and allowing horizontal swingable movement of the combination of serially connected hoses about the vertical axis of the hinge, said second hinge being horizontally spaced from and supported by said first hinge, and allowing horizontal swingable movement of a portion of said combination of serially connected hoses about the vertical axis of the second hinge, said third hinge permitting vertical movement of said hose portion of the combination of hoses about the horizontal axis of the horizontal pin, said combination of hoses comprising:

a first elongated rigid hose having ends and mounted on the first hinge, and connected in fluid communication with the short rigid hose, said elongated hose extending to the second hinge such that the ends of the first elongated hose are located adjacent the first and second hinges, means connecting the end of the first elongated rigid hose adjacent the second hinge to the second hinge, a second elongated rigid hose having ends, one of which is attached to the third hinge by the rotatable lugs, the end supported by the third hinge lying adjacent the end of the first rigid hose that is adjacent the second hinge, a flexible hose serially connecting the end of the first elongated rigid hose to the end of the second elongated rigid hose at the second hinge, and an elongated flexible hose having one end connected to the end of the second rigid hose remote from the second hinge, with the other end of the elongated flexible hose being free to be maneuvered as desired.

2. An economical hinge arrangement for swinging serially connected, elongated hoses about the axes of at least two hinges, comprising:

a first hinge comprising a generally U-shaped bracket defined by legs, and a first tubular member having a first axial center and supported between the legs of the U-shaped bracket, with a first pin means extending through said legs and through the axial center of the first tubular member, said first hinge defining a first axis, and a second hinge comprising a second pin and a second tubular member having a second axial center, with a second pin extending through the second axial center of the second tubular member, said second hinge defining a second axis, at least a first and a second elongated rigid hose each having ends, and being serially connected together, said first hinge supporting said hoses and allowing swingable movement of the hoses about the first axis of the hinge, said second hinge being spaced from and supported by said first hinge, and allowing swingable movement of the second hose about the second axis of the second hinge, said first elongated hose being mounted on the first hinge, and extending to the second hinge such that the ends of the first elongated hose are located adjacent the first and second hinges, means connecting said end of the first rigid hose adjacent said second hinge to the second hinge, said second elongated rigid hose having one end attached to said second hinge, and lying adjacent the end of said first rigid hose that is adjacent the second hinge, and a flexible hose serially connecting the ends of said rigid hoses together.

*3. In combination, a manually extendible hose assembly and a tank carried on a service vehicle, said tank having a top, a bottom, and first and second substantially vertical sides, said hose assembly disposed in communication with the interior of said tank and for transportation by said service vehicle comprising:*

*a first support means mounted on said first substantially vertical side and adjacent to a first end of said tank;*

*at least first and second elongated rigid hoses connected in serial, pivoted relation, each of said at least first and second rigid hoses having first and second ends, with said first end of the first hose of said at least first and second rigid hoses disposed in communication with said interior of said tank and pivotally mounted to said first support means for horizontal movement in a first horizontal plane against and away from said first substantially vertical side of said tank;*

*a second support means disposed between the first and second rigid hoses of said at least first and second rigid hoses, said second support means pivotally connected to said second end of the first hose of said at least first and second hoses and to said first end of said second rigid hose of said at least first and second hoses for movement thereof in a second horizontal plane against and away from said first substantially vertical side of said tank; and*

*means for securing said at least first and second rigid hoses in vertically spaced, stored relation against said first substantially vertical side of said tank responsive to movement in said first and second horizontal planes of said at least first and second rigid hoses against said first substantially vertical side of said tank.*

*4. An assembly as set forth in claim 3 including a first flexible hose connecting the second end of said first rigid hose of said at least first and second rigid hoses to the first end of said second hose of said at least first and second rigid hoses.*

*5. An assembly as set forth in claim 4 including resilient support means extending between said second support means and said second rigid hose of said at least first and second hoses for support of said second rigid hose of said at least first and second hoses in said extended relation and for limiting vertical movement of said second rigid hose of said at least first and second rigid hoses.*

*6. An assembly as set forth in claim 5 including a second flexible hose connected to said second end of said second rigid hose of said at least first and second rigid hoses and disposed for vertically folded side-by-side, stored relation with said second rigid hose of said at least first and second rigid hoses longitudinally along the length of said first substantially vertical side of said tank, said second rigid hose of said at least first and second rigid hoses disposed for extended relation from said first rigid hose of said at least first and second rigid hoses.*

*7. An assembly as set forth in claim 6 wherein said second flexible hose is provided with first and second ends, said first end being connected to said second end of said second rigid hose of said at least first and second rigid hoses, a valve and nozzle assembly connected to said second end of said second flexible hose, and means for securing said second flexible hose to said first substantially vertical side of said tank.*

* * * * *